(12) United States Patent
Habel

(10) Patent No.: US 11,585,453 B1
(45) Date of Patent: Feb. 21, 2023

(54) ONE-WAY SUCTION CHECK VALVE FOR FACIAL MASK INTEGRATION

(71) Applicant: Mark Habel, Las Vegas, NV (US)

(72) Inventor: Mark Habel, Las Vegas, NV (US)

( * ) Notice: Subject to any disclaimer, the term of this patent is extended or adjusted under 35 U.S.C. 154(b) by 0 days.

(21) Appl. No.: 17/681,600

(22) Filed: Feb. 25, 2022

(51) Int. Cl.
- *F16K 24/00* (2006.01)
- *F16K 15/14* (2006.01)
- *A62B 18/10* (2006.01)
- *F16K 27/02* (2006.01)

(52) U.S. Cl.
CPC ............ *F16K 15/148* (2013.01); *A62B 18/10* (2013.01); *F16K 27/0209* (2013.01)

(58) Field of Classification Search
CPC .......................... F16K 15/148; F16K 27/0209
See application file for complete search history.

(56) References Cited

U.S. PATENT DOCUMENTS

2019/0217133 A1* 7/2019 Cho .................... F16K 27/0209
2022/0186852 A1* 6/2022 Debald ................ F16K 24/046

* cited by examiner

*Primary Examiner* — P. Macade Nichols
(74) *Attorney, Agent, or Firm* — Steven Rinehart

(57) ABSTRACT

A one-way ventilation valve for integration with a face mask comprising an upper retaining ring, a lower retaining ring, and an elastomeric diaphragm; the upper retaining ring comprising a conduit positioned centrally by two sets of spokes, the conduit adapted to act as an oxygen port for receiving oxygen fed to the mask through tubing. The mask is adapted to protect caretakers from sick patients wearing the mask.

9 Claims, 6 Drawing Sheets

ONE-WAY SUCTION CHECK VALVE FOR FACIAL MASK INTEGRATION

FIELD OF THE INVENTION

This invention relates to ventilation valves and masks, and more particularly relates to a one-way check valve and oxygen port which may be integrated with a facial mask in mitigating viral transmissions from a patient to a caretaker.

BACKGROUND

Description of the Related Art

The present invention constitutes an improvement to standard face masks used to mitigate transmission of, and viral exposure to, viruses common in modern society, including viruses transmitted on airborne, contaminated droplets of water (typically expelled from the lungs and throat); and, in some cases, on aerosols.

Medical masks, including nonsurgical N95 masks and KN95 masks, are commonly worn by the general population to reduce the risk of exposure to the wearer. With the advent of Covid and its multiple variants, fear is heightened across the world of infection and illness or death occasioned by severe acute respiratory syndrome incidental to Covid and other common illness. Other viruses are similarly transmitted, including influenza and norovirus.

Masks are typically worn to protect the wearer of the mask from infection by others. These masks can be difficult to breathe through as the fresh air must be sucked through a filter forming the mask. Although masks are known which exist to protect wearers from infection by others, not efficient mask is known in the art which exists to protect other from the wearer of the mask. Those who are infected typically find it difficult to breath in a medical mask, where inhaled breath must be forced through the gauze exterior of the mask, a valve, or a filter. It can be particularly difficult to breath when the wearer of the mask has common respiratory problems incidental to their illness. Without common exhalation valve often integrated into these mask, infected air remains static behind traditional masks in front of a user/wearer's face where the viral load and $CO_2$ can become more concentrated without ventilation. This static air, however, does not affect a wearer who is already infected.

There is a need to protect caretakers from infection by patients already infected as well as to protect other individuals from infection in hospital, nursing home, and home residential settings. There is also a need for a mask which can quickly be adapted to integrate with oxygen fed into the mask via tubing. It would be beneficial to provide a mask designed not to protect the wearer of the mask from infection, but to protect others from infection by the wearer, which mask is configurable to allow the wearer to breathe more easily. Existing valves typically used in masks are not adapted for this purpose.

There is a need in the art for an implement in the form of a face mask and customized, integrated valve adapted to overcome these deficiencies in the art.

SUMMARY

From the foregoing discussion, it should be apparent that a need exists for a one-way check valve body and facial mask integrating the same which overcomes inefficiencies with the prior art.

The present invention has been developed in response to the present state of the art, and in particular, in response to the problems and needs in the art that have not yet been fully solved by currently available apparti and implements.

Accordingly, the present invention has been developed to provide a one-way check valve adapted for integration with a facial mask comprising: an upper retaining ring comprising: an annular housing body; a first lower flange affixed inferiorly to the cylindrical housing body; a superiorly rising conduit defining a hollow through passageway, the conduit disposed centrally to the cylindrical housing body; wherein the conduit defines an open top end at a distal, terminal end of the conduit; a plurality of spokes interconnecting the cylindrical housing body and conduit; a lower retaining housing comprising: a cylindrical housing body; a second lower flange affixed inferiorly to the cylindrical housing body; a cylindrical receptacle positioned centrally within the cylindrical housing body adapted to receive the conduit; a plurality of spokes interconnecting the cylindrical housing body and the cylindrical receptacle; and an elastomeric diaphragm having a planar top surface and a planar lower surface.

The terminal end of the conduit may comprise a plurality of tapered flanges circumscribing the conduit. The lower flange of the upper retaining ring may flare outwardly and be beveled. The one-way check valve may further comprise a terminal cap detachably affixable to the terminal end of the conduit.

The elastomeric diaphragm may position between the cylindrical body and the upper retaining ring. In various embodiments, the elastomeric diaphragm defines a plurality of notches around a perimeter.

In some embodiments, the elastomeric diaphragm defines a central orifice. One of the upper retaining ring and the lower retaining ring may define a track adapted to receive a guide protuberance and form a friction fit therewith.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
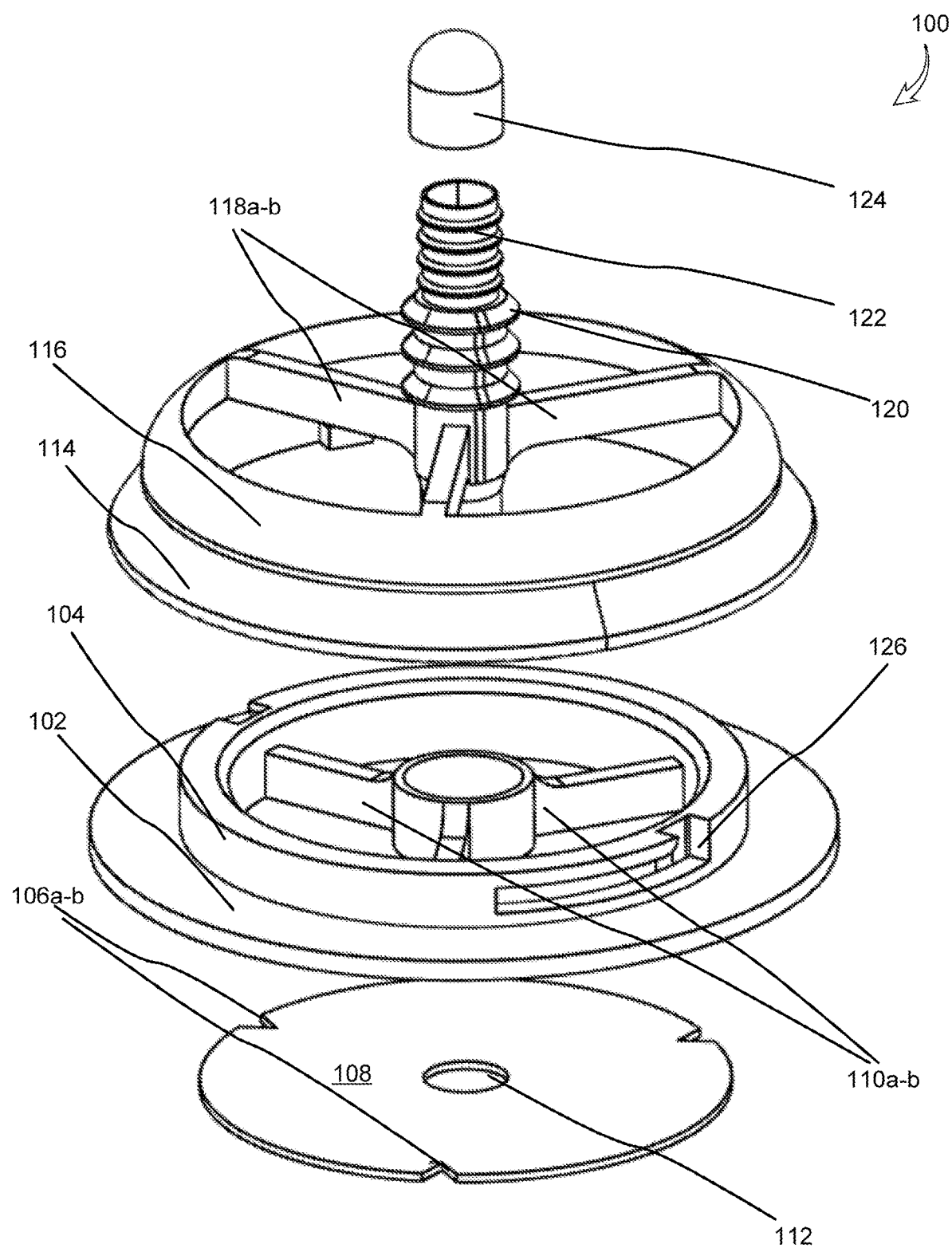
FIG. 1 is an exploded, side perspective view of a one-way check valve with a vertical port for facial mask integration in accordance with the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a valve for use with medical face masks which includes a floating valve seat and vertical or horizontal ventilation port.

The following key is provided for reference in this disclosure. The components indicated each of the following numerals are labeled as shown and further described below:

Indicated at 102 is a flange in the lower retaining ring.

Indicated at 104 is the cylindrical body of the lower retaining ring.

Indicated at 106 is a notch in the elastomeric valve diaphragm.

Indicated at 108 is an elastomeric valve diaphragm.

Indicated at 110 is a spoke or beam.

Indicated at 112 is the bore, or orifice, in the elastomeric valve diaphragm 108 or a valve seat.

Indicated at 114 is a lower flange of the upper retaining ring.

Indicated at 116 is the rounded, annular body of the upper retaining ring.

Indicated at 118 is a spoke or beam.

Indicated at 120 is a tapered flange circumscribing the inhalation port.

Indicated at 122 is an inhalation port.

Indicated at 124 is a distal cap.

Indicated at 126 is a track adapted to form a friction fit or locking mechanism in conjunction with the upper retaining ring.

Indicated at 202 is a molded, polymeric or metal alloy, upper retaining ring.

Indicated at 204 is a molded, polymeric or metal alloy, lower retaining ring.

Indicated at 208 is a guide protuberance.

Indicated at 210 is a flange, or ribbing, on the port 122.

Indicated at 212 is a hollow tubular conduit.

Indicated at 214 is an annular receptacle for receiving and stabilizing the conduit 212.

Indicated at 216 is a cylindrical passageway defined by the conduit 212.

Indicated at 218 is a flange.

Indicated at 302 is an open of the cylindrical passageway 216.

Indicated at 304 is a block cantilever.

Indicated at 306 is a central, cylindrical recess.

Indicated at 402 is the wearer.

Indicated at 502 is a concave mouth covering.

Indicated at 504 is a Velcro® pad.

Indicated at 506 is a Velcro® pad.

Figure 2:
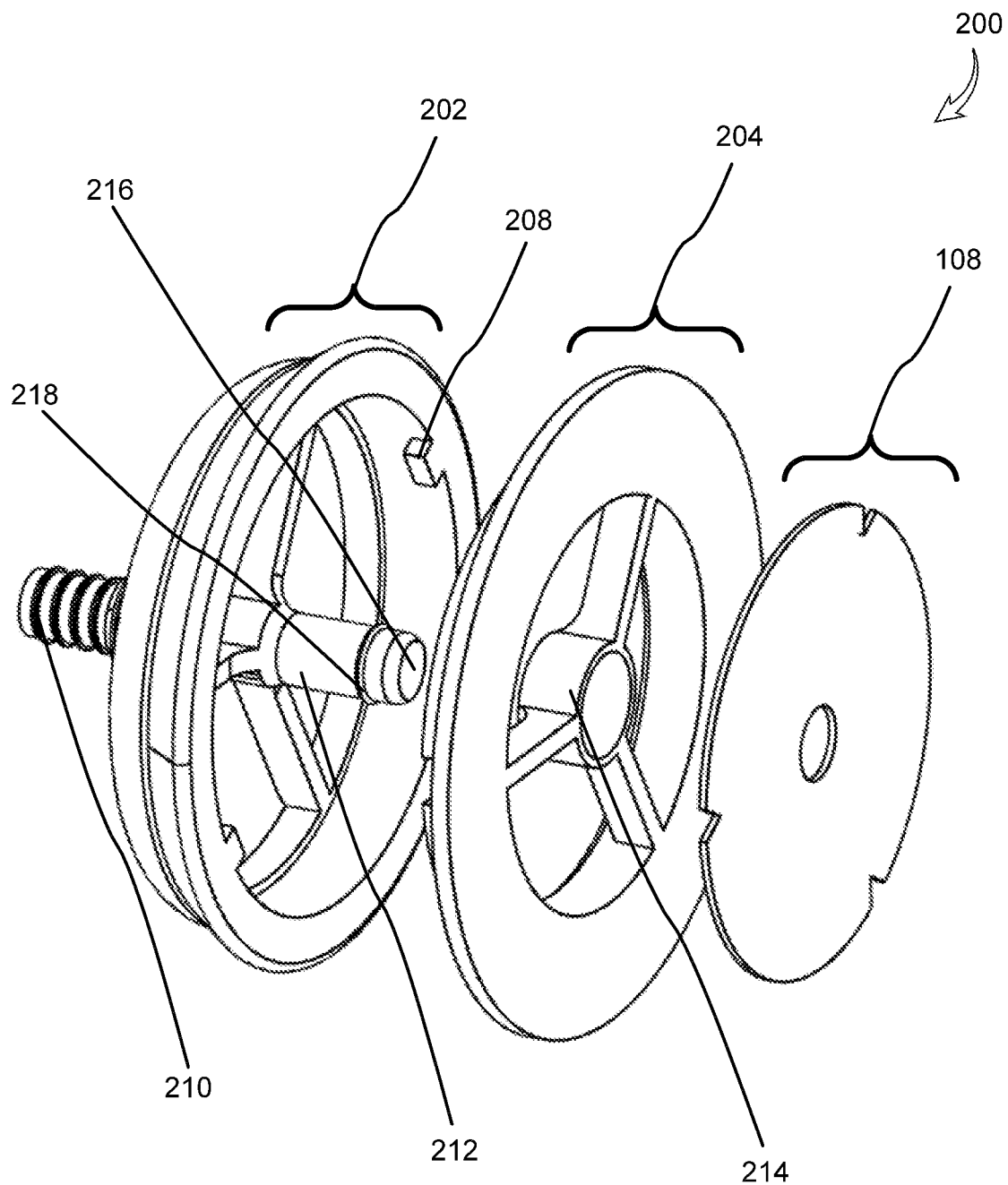
FIG. 2 is an exploded, lower, side perspective view of a one-way check valve with a vertical port for facial mask integration in accordance with the present invention.
Figure 3:
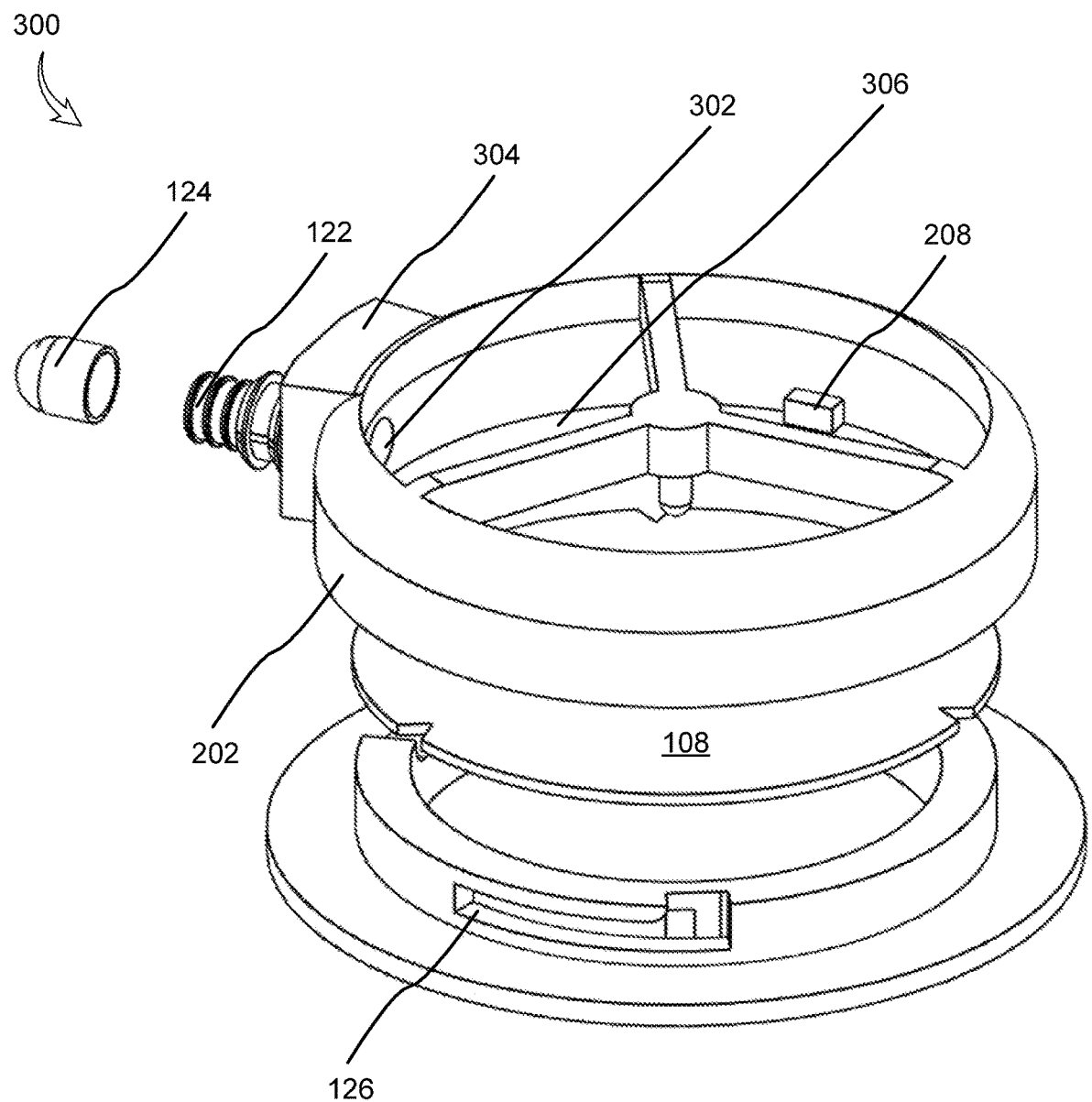
FIG. 3 is an exploded, side perspective view of a one-way check valve with a horizontal port for facial mask integration in accordance with the present invention.

FIGS. 1-3 illustrate exploded, side perspective views of a one-way check valve with a vertical or horizontal port for facial mask integration in accordance with the present invention.

The apparati 100, 200, 300 include an upper retaining ring 202 and lower retaining ring 204. The upper retaining ring 202 and the lower retaining ring 204 are adapted to detachably interlock together using a track 126 and guide protuberance 208 which travels within the track 126.

The track 126 is recessed into the cylindrical body 104 of the lower retaining ring 204.

In various embodiments, the apparati 100, 200, 300 include an elastomeric, or silicone, valve diaphragm 108 which is adapted to flex, deflect, or displace itself, in response to sucking force of the wearer of a mask 500, which permits unrestricted air flow through the valve 100, 200, 300 through a passageway 216. This passageway 216 may jut superiorly to the diaphragm 108. The diaphragm 108 may define a plurality of notches 106 about its perimeter facilitating the ability of the diaphragm 108, when made of silicone, to flex. The diaphragm 108 may be adapted to form an airtight seal with one or more of the flange 102 and the cylindrical body 104.

A plurality of spokes 110 (or beams 110) radiate concentrically from the cylindrical receptacle 214, stabilizing the cylindrical receptacle 214 centrically within the lower retaining ring 204. Likewise, a plurality of spokes 118 (or beams 118) radiate concentrically from the cylindrical receptacle 214, stabilizing the conduit 212 within the upper retaining ring 202. The conduit 212 may be formed as a single, integrated piece with the components indicated at 118, 116 and 114, or the conduit 212 may be separately molded.

The bore 112 in the diaphragm 108 snaps over the flange 218.

The upper retaining ring 202 comprises or consists of a flange 114 which may flare outwardly, or be tapered or beveled exteriorly. A rounded, annular body 116 of the upper retaining ring positions superiorly on the flange 114 and may be formed therewith as a single integrated piece.

The lower retaining ring 204 comprises or consists of a flange 102 and a cylindrical body 104 affixed superiorly thereto. Both the upper retaining ring 202 and the lower retaining ring 204 may be formed of molded polymeric and/or metal alloy components.

An inhalation port 122 positions superiorly to the spokes 118, rising laterally as shown in apparatus 100.

A plurality of flanges 210, 120, or tubular fittings, may position at regular or irregularly-spaced intervals across the port 122 for use with flexible tubing, cylindrical fittings, or threaded components. In various embodiments, as shown, smaller flanges 210 which are smaller in diameter position superiorly to larger flanges 120 which are larger in diameter. The smaller flanges 210 are adapted to receive one size of flexible, polymeric tubing 406 adapted to feed oxygen into a mask 402. The larger flanges 120 are adapted to receive flexible, polymeric tubing 406 which is larger in diameter, also designed to feed oxygen to the mask 402.

It is an object of the present invention to provide a mask which may be used in hospital and residential settings to protect caretakers of sick individuals wearing the mask 402. In hospital settings, when oxygen is available, the cap 124 may be removed from the port 122 and the port 122 detachably affixed to oxygen tubing 406. In residential settings, the cap 124 is left in place.

In some embodiments, the flexible tubing 406 may be adapted to carry exhaled air away in a tube from inside the mask 402, and this tubing 406 may comprise a negative air pressure or a vacuum. In some embodiments, the tubing 406 may comprise an air filter. In these embodiments, the mask 402 may be formed from nonpermeable, polymeric products which help direct exhaled air into the tubing 406.

The port 122 may be exteriorly or interiorly threaded or barbed.

A block cantilever 304 may position laterally to 202 as shown. The port 122 may jut laterally therefrom, cantilevering from the remaining assembly constituting the valve 300.

The elastomeric diaphragm 108 may position between 202 and 204 as shown. Alternatively, the diaphragm 108 may position inferiorly to 204.

Figure 4:
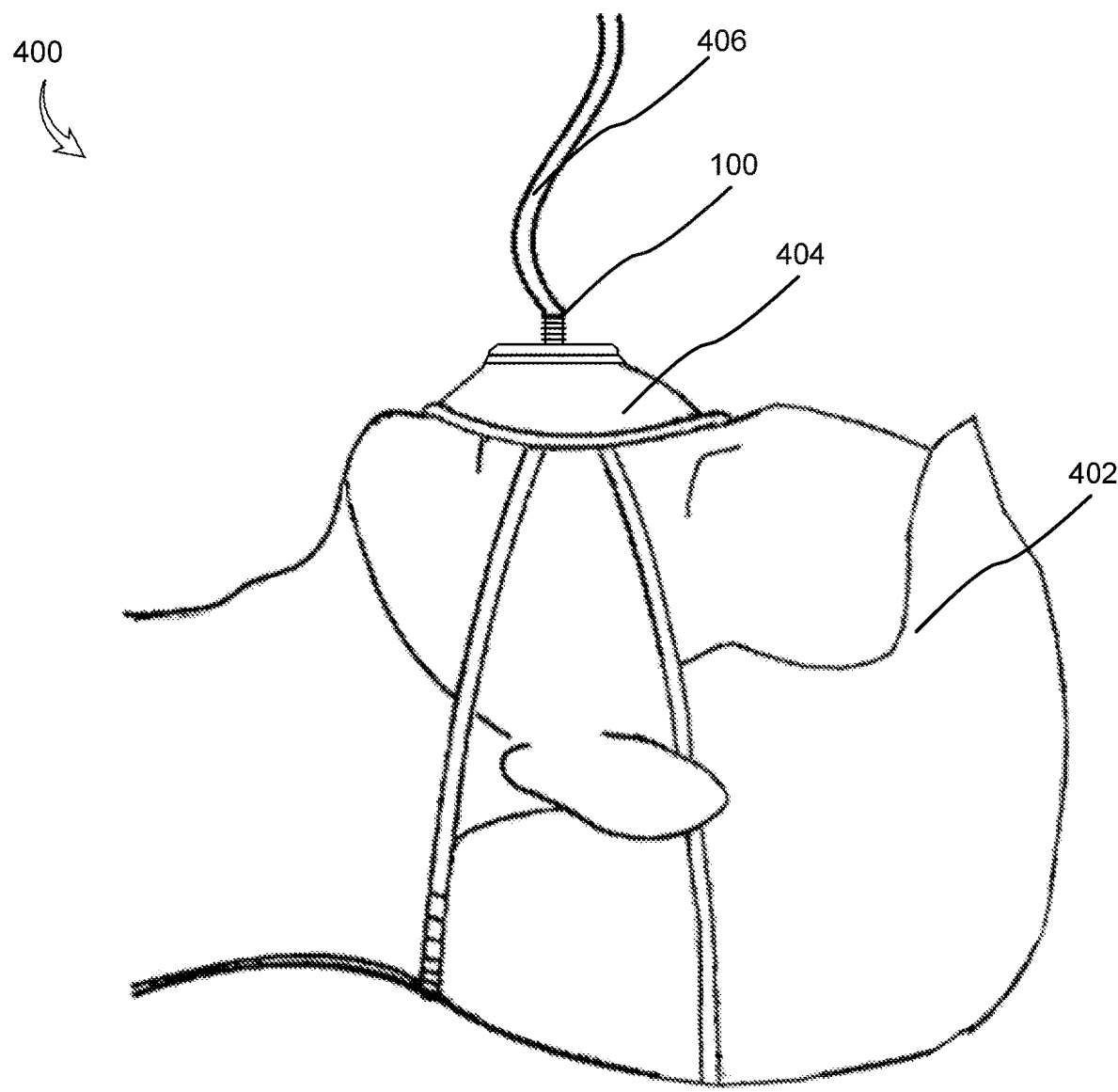
FIG. 4 is an environmental, side perspective view of a mask integrating a one-way check valve with a vertical port in accordance with the present invention.

FIG. 4 is an environmental, side perspective view of a mask integrating a one-way check valve with a vertical port in accordance with the present invention.

The mask 400 positions on the wearer 402 as shown, with the portion rising longitudinally.

Figure 5:
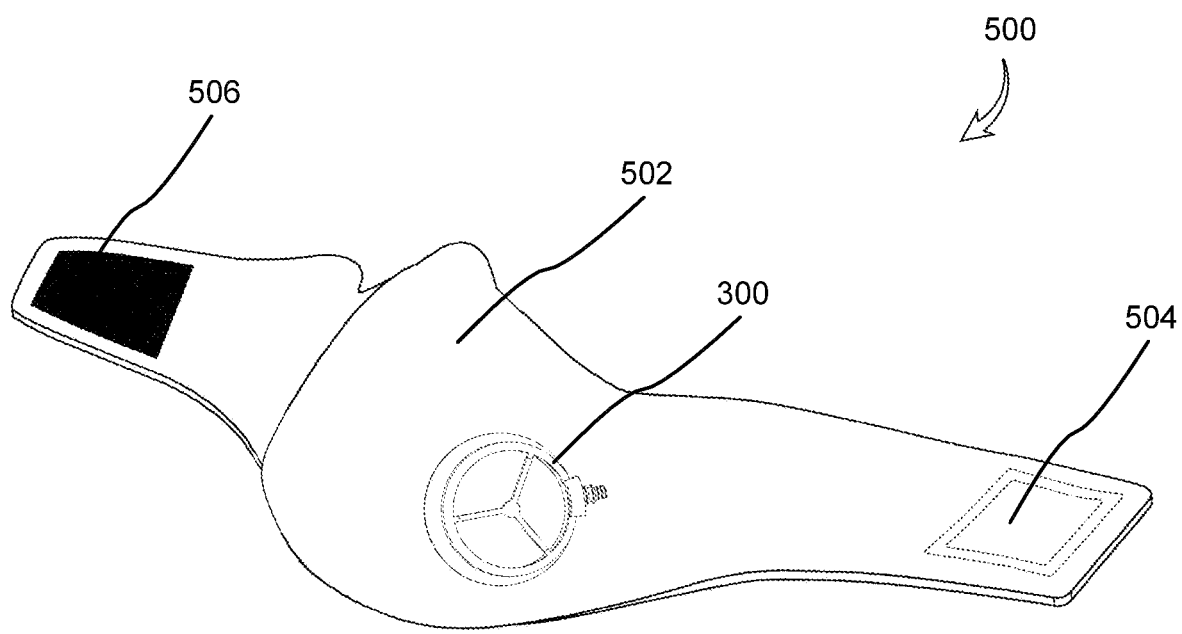
FIG. 5 is an environmental, side perspective view of a mask integrating a one-way check valve with a horizontal port in accordance with the present invention.

FIG. 5 is an environmental, side perspective view of a mask integrating a one-way check valve with a horizontal port in accordance with the present invention.

The mask 500 may comprise an N95 mask, a CBRN mask, or other masks known to those of skill in the art.

In various embodiments, the mask 500 comprises a plurality of valves 100, 300 positioning across the face 502 of the mask 500. The face 502 comprises a concave, or convex, face covering.

The valves 100, 200, 300 and mask 500 may each consist of, or comprise, any of the previously recited or disclosed components.

Figure 6:
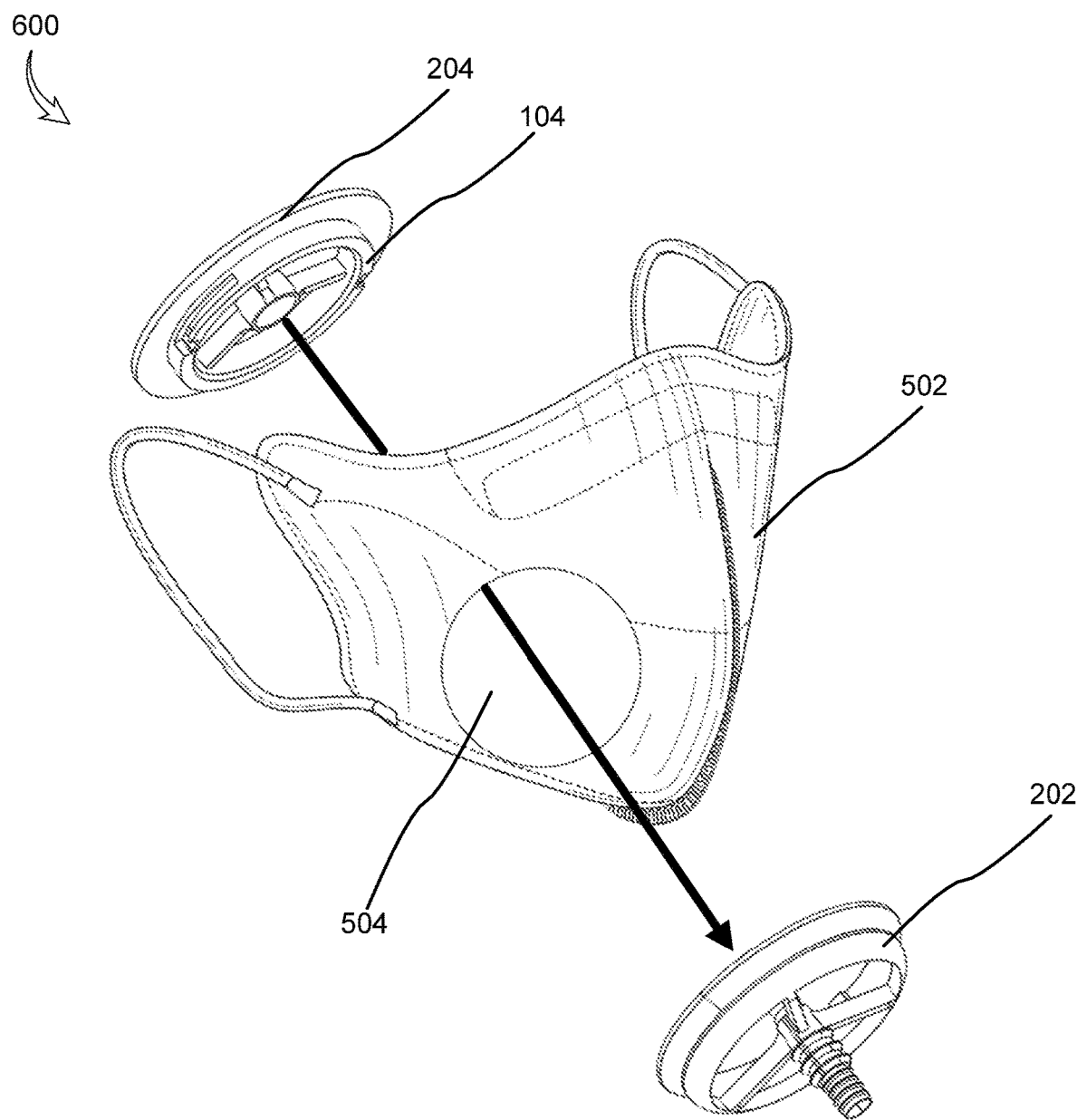
FIG. 6 is an exploded, side perspective view of a mask integrating a one-way check valve with a horizontal port in accordance with the present invention.

FIG. 6 is an exploded, side perspective view of a mask integrating a one-way check valve with a horizontal port 600 in accordance with the present invention.

As shown, the mask 502 defines a circular aperture 504 through which the ring 104 traverses and interlocks with the upper retaining ring 202. The mask 502 is clasped between the lower retaining ring 204 and the upper retaining ring 202. In this manner, the apparatus 600 is adapted to also facilitate use of multiple masks 502, layered upon one another, and all clasped between the upper retaining ring 202 and the lower retaining ring 204.

What is claimed is:

1. A one-way check valve adapted for integration with a facial mask comprising:
   an upper retaining ring comprising:
     an annular housing body;
     a first lower flange affixed inferiorly to the cylindrical housing body;
     a superiorly rising conduit defining a hollow through passageway, the conduit disposed centrally to the cylindrical housing body;
     wherein the conduit defines an open top end at a distal, terminal end of the conduit;
     a plurality of spokes interconnecting the cylindrical housing body and conduit;
   a lower retaining ring comprising:
     a cylindrical housing body;
     a second lower flange affixed inferiorly to the cylindrical housing body;
     a cylindrical receptacle positioned centrally within the cylindrical housing body adapted to receive the conduit;
     a plurality of spokes interconnecting the cylindrical housing body and the cylindrical receptacle;
   an elastomeric diaphragm having a planar top surface and a planar lower surface.

2. The one-way check valve of claim 1, wherein the terminal end of the conduit comprises a plurality of tapered flanges circumscribing the conduit.

3. The one-way check valve of claim 1 wherein the lower flange of the upper retaining ring flares outwardly and is beveled.

4. The one-way check valve of claim 1 further comprising a terminal cap detachably affixable to the terminal end of the conduit.

5. The one-way check valve of claim 1, wherein the elastomeric diaphragm positions between the cylindrical body and the upper retaining ring.

6. The one-way check valve of claim 5, wherein the elastomeric diaphragm positions between the cylindrical body and the upper retaining ring.

7. The one-way check valve of claim 5, wherein the elastomeric diaphragm defines a plurality of notches around a perimeter.

8. The one-way check valve of claim 5, wherein the elastomeric diaphragm defines a central orifice through which the conduit traverses.

9. The one-way check valve of claim 1, wherein one of the upper retaining ring and the lower retaining ring defines a track adapted to receive a guide protuberance and form a friction fit therewith.

* * * * *